(12) United States Patent
DiGiovanni (10) Patent No.: US 9,962,669 B2
(45) Date of Patent: May 8, 2018

(54) CUTTING ELEMENTS AND EARTH-BORING TOOLS INCLUDING A POLYCRYSTALLINE DIAMOND MATERIAL

(71) Applicant: Baker Hughes Incorporated, Houston, TX (US)

(72) Inventor: Anthony A. DiGiovanni, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days. days.

(21) Appl. No.: 15/335,955

(22) Filed: Oct. 27, 2016

(65) Prior Publication Data

US 2017/0043309 A1 Feb. 16, 2017

Related U.S. Application Data (60) Division of application No. 14/929,611, filed on Nov. 2, 2015, now Pat. No. 9,481,073, which is a
(Continued)

(51) Int. Cl.
*B01J 3/06* (2006.01)
*B24D 18/00* (2006.01)
(Continued)

(52) U.S. Cl.
CPC .......... *B01J 3/062* (2013.01); *B24D 18/0009* (2013.01); *B24D 99/00* (2013.01); *E21B 10/56* (2013.01);
(Continued)

(58) Field of Classification Search
CPC ....... B01J 3/00; B01J 3/06; B01J 3/062; B01J 2203/062; B01J 2203/0655;
(Continued)

(56) References Cited

U.S. PATENT DOCUMENTS 3,663,475 A   5/1972 Figiel
3,709,826 A   1/1973 Pitt et al.
(Continued)

FOREIGN PATENT DOCUMENTS

CN     1279729 A    1/2001
CN     1643183 A    7/2005
(Continued)

OTHER PUBLICATIONS

"Hydrogen-terminated diamond surfaces and interfaces" Hiroshi Kawarada Surface Science Reports 26 (1996) 205-259. Available online Feb. 11, 1999. http://dx.doi.org/10.1016/S0167-5729(97)80002-7.*

(Continued)

*Primary Examiner* — Jennifer A Smith
*Assistant Examiner* — Alexandra M Moore
(74) *Attorney, Agent, or Firm* — TraskBritt (57) ABSTRACT

Methods of forming polycrystalline diamond include encapsulating diamond particles and a hydrocarbon substance in a canister, and subjecting the encapsulated diamond particles and hydrocarbon substance to a pressure and a temperature sufficient to form inter-granular bonds between the diamond particles. Cutting elements for use in an earth-boring tool include a polycrystalline diamond material formed by such processes. Earth-boring tools include such cutting elements.

16 Claims, 5 Drawing Sheets

Related U.S. Application Data continuation of application No. 13/619,210, filed on Sep. 14, 2012, now Pat. No. 9,205,531.

(60) Provisional application No. 61/535,470, filed on Sep. 16, 2011.

(51) Int. Cl.
  *B24D 99/00* (2010.01)
  *E21B 10/567* (2006.01)
  *E21B 10/56* (2006.01)
  *E21B 10/54* (2006.01)

(52) U.S. Cl.
  CPC ....... *E21B 10/567* (2013.01); *B01J 2203/062* (2013.01); *B01J 2203/0605* (2013.01); *B01J 2203/0625* (2013.01); *B01J 2203/0655* (2013.01); *B01J 2203/0685* (2013.01); *E21B 10/54* (2013.01)

(58) Field of Classification Search
  CPC ............. B01J 2203/0685; B24D 18/00; B24D 18/0009; B24D 3/00; E21B 10/00; E21B 10/46; E21B 10/54; E21B 10/55; B23D 27/14
  See application file for complete search history.

(56) References Cited

U.S. PATENT DOCUMENTS

| | | |
|---|---|---|
| 3,745,623 A | 7/1973 | Wentorf, Jr. et al. |
| 4,148,368 A | 4/1979 | Evans |
| 4,224,380 A | 9/1980 | Bovenkerk et al. |
| 4,242,106 A | 12/1980 | Morelock |
| 4,311,490 A | 1/1982 | Bovenkerk et al. |
| 4,412,980 A | 11/1983 | Tsuji et al. |
| 4,483,836 A | 11/1984 | Adadurov |
| 4,525,179 A | 6/1985 | Gigl |
| 4,592,433 A | 6/1986 | Dennis |
| 4,604,106 A | 8/1986 | Hall et al. |
| 4,605,343 A | 8/1986 | Hibbs, Jr. et al. |
| 4,636,253 A | 1/1987 | Nakai et al. |
| 4,664,705 A | 5/1987 | Horton et al. |
| 4,694,918 A | 9/1987 | Hall |
| 4,726,718 A | 2/1988 | Meskin et al. |
| 4,784,023 A | 11/1988 | Dennis |
| 4,797,241 A | 1/1989 | Peterson et al. |
| 4,861,350 A | 8/1989 | Phaal et al. |
| 4,866,885 A | 9/1989 | Dodsworth |
| 4,903,164 A | 2/1990 | Bishop et al. |
| 4,940,180 A | 7/1990 | Martell |
| 4,944,772 A | 7/1990 | Cho |
| 4,976,324 A | 12/1990 | Tibbitts |
| 5,011,514 A | 4/1991 | Cho et al. |
| 5,027,912 A | 7/1991 | Juergens |
| 5,127,923 A | 7/1992 | Bunting et al. |
| 5,217,081 A | 6/1993 | Waldenstrom et al. |
| 5,443,337 A | 8/1995 | Katayama |
| 5,472,376 A | 12/1995 | Olmstead et al. |
| 5,533,582 A | 7/1996 | Tibbitts |
| 5,540,904 A | 7/1996 | Bovenkerk et al. |
| 5,645,617 A | 7/1997 | Frushour |
| 5,662,183 A | 9/1997 | Fang |
| 5,667,028 A | 9/1997 | Truax et al. |
| 5,685,769 A | 11/1997 | Adia et al. |
| 5,722,499 A | 3/1998 | Nguyen et al. |
| 5,807,433 A | 9/1998 | Poncelet et al. |
| 5,979,577 A | 11/1999 | Fielder |
| 5,979,578 A | 11/1999 | Packer |
| 5,980,982 A | 11/1999 | Degawa et al. |
| 6,009,963 A | 1/2000 | Chaves et al. |
| 6,045,440 A | 4/2000 | Johnson et al. |
| 6,148,937 A | 11/2000 | Mensa-Wilmot et al. |
| 6,149,695 A | 11/2000 | Adia et al. |
| 6,187,068 B1 | 2/2001 | Frushour et al. |
| 6,214,079 B1 | 4/2001 | Kear et al. |
| 6,220,375 B1 | 4/2001 | Butcher et al. |
| 6,302,405 B1 | 10/2001 | Edwards |
| 6,325,165 B1 | 12/2001 | Eyre |
| 6,344,149 B1 | 2/2002 | Oles |
| 6,350,488 B1 | 2/2002 | Lee et al. |
| 6,361,873 B1 | 3/2002 | Yong et al. |
| 6,377,387 B1 | 4/2002 | Duthaler et al. |
| 6,533,644 B1 | 3/2003 | Horie et al. |
| 6,544,599 B1 | 4/2003 | Brown et al. |
| 6,655,234 B2 | 12/2003 | Scott |
| 6,655,845 B1 | 12/2003 | Pope et al. |
| 6,719,074 B2 | 4/2004 | Tsuda et al. |
| 6,951,578 B1 | 10/2005 | Belnap et al. |
| 6,991,049 B2 | 1/2006 | Eyre et al. |
| 7,070,635 B2 | 7/2006 | Frushour |
| 7,074,247 B2 | 7/2006 | Tank et al. |
| 7,147,687 B2 | 12/2006 | Mirkin et al. |
| 7,224,039 B1 | 5/2007 | McGuire et al. |
| 7,235,296 B2 | 6/2007 | Hunt et al. |
| 7,348,298 B2 | 3/2008 | Zhang et al. |
| 7,419,941 B2 | 9/2008 | Waynick |
| 7,435,296 B1 | 10/2008 | Sung |
| 7,449,432 B2 | 11/2008 | Lockwood et al. |
| 7,493,973 B2 | 2/2009 | Keshavan et al. |
| 7,516,804 B2 | 4/2009 | Vail |
| 7,572,332 B2 | 8/2009 | Gruen |
| 7,585,342 B2 | 9/2009 | Cho |
| 7,628,234 B2 | 12/2009 | Middlemiss |
| 7,635,035 B1 | 12/2009 | Bertagnolli et al. |
| 7,647,992 B2 | 1/2010 | Fang et al. |
| 7,690,589 B2 | 4/2010 | Kerns |
| 7,972,397 B2 | 7/2011 | Vail |
| 8,080,071 B1 | 12/2011 | Vail |
| 8,083,012 B2 | 12/2011 | Voronin et al. |
| 8,118,896 B2 | 2/2012 | Can et al. |
| 8,147,790 B1 | 4/2012 | Vail et al. |
| 8,911,521 B1 | 12/2014 | Miess |
| 8,974,562 B2 | 3/2015 | Chakraborty et al. |
| 8,985,248 B2 | 3/2015 | DiGiovanni et al. |
| 2003/0175498 A1 | 9/2003 | Hunt et al. |
| 2003/0191533 A1 | 10/2003 | Dixon et al. |
| 2004/0022861 A1 | 2/2004 | Williams et al. |
| 2004/0037948 A1 | 2/2004 | Tank et al. |
| 2004/0060243 A1 | 4/2004 | Fries et al. |
| 2004/0118762 A1 | 6/2004 | Xu et al. |
| 2004/0121070 A1 | 6/2004 | Xu et al. |
| 2005/0019114 A1 | 1/2005 | Sung |
| 2005/0139397 A1 | 1/2005 | Achilles et al. |
| 2005/0136667 A1 | 6/2005 | Sung |
| 2005/0158549 A1 | 7/2005 | Khabashesku et al. |
| 2005/0159634 A1 | 7/2005 | Dahl et al. |
| 2005/0161212 A1 | 7/2005 | Leismer et al. |
| 2006/0113546 A1 | 6/2006 | Sung |
| 2006/0166615 A1 | 7/2006 | Tank et al. |
| 2007/0036896 A1 | 2/2007 | Sung et al. |
| 2007/0102199 A1* | 5/2007 | Smith .................... B22F 7/062 175/374 |
| 2007/0187153 A1 | 8/2007 | Bertagnolli |
| 2007/0254560 A1 | 11/2007 | Woo et al. |
| 2008/0023230 A1 | 1/2008 | Cho |
| 2008/0023231 A1 | 1/2008 | Vail |
| 2008/0127475 A1 | 6/2008 | Griffo |
| 2008/0142267 A1 | 6/2008 | Griffin et al. |
| 2008/0168717 A1 | 7/2008 | Can et al. |
| 2008/0179109 A1 | 7/2008 | Belnap et al. |
| 2008/0206576 A1 | 8/2008 | Qian et al. |
| 2008/0209818 A1 | 9/2008 | Belnap et al. |
| 2009/0022952 A1 | 1/2009 | Keshavan |
| 2009/0022969 A1 | 1/2009 | Zhang et al. |
| 2009/0042166 A1 | 2/2009 | Craig et al. |
| 2009/0090918 A1 | 4/2009 | Hobart et al. |
| 2009/0127565 A1 | 5/2009 | Sung |
| 2009/0158670 A1 | 6/2009 | Vail |
| 2009/0178345 A1 | 7/2009 | Russell et al. |
| 2009/0218146 A1 | 9/2009 | Fang et al. |
| 2009/0218276 A1 | 9/2009 | Linford et al. |
| 2009/0218287 A1 | 9/2009 | Vail et al. |
| 2009/0221773 A1 | 9/2009 | Linford et al. |

(56) References Cited

U.S. PATENT DOCUMENTS

| | | |
|---|---|---|
| 2009/0257942 A1 | 10/2009 | Sung |
| 2009/0277839 A1 | 11/2009 | Linford |
| 2009/0286352 A1 | 11/2009 | Sung |
| 2009/0313908 A1 | 12/2009 | Zhang et al. |
| 2010/0012389 A1 | 1/2010 | Zhang et al. |
| 2010/0041315 A1 | 2/2010 | Sung |
| 2010/0068503 A1 | 3/2010 | Neogi et al. |
| 2010/0069567 A1 | 3/2010 | Petrov et al. |
| 2010/0129615 A1 | 5/2010 | Chizik et al. |
| 2010/0187925 A1 | 7/2010 | Tingle et al. |
| 2010/0209665 A1 | 8/2010 | Konovalov et al. |
| 2011/0031034 A1 | 2/2011 | DiGiovanni et al. |
| 2011/0042147 A1 | 2/2011 | Fang et al. |
| 2011/0059876 A1 | 3/2011 | Takahama et al. |
| 2011/0088954 A1 | 4/2011 | DiGiovanni et al. |
| 2011/0252711 A1 | 10/2011 | Chakraborty et al. |
| 2011/0252712 A1 | 10/2011 | Chakraborty et al. |
| 2011/0252713 A1 | 10/2011 | Chakraborty et al. |
| 2012/0003479 A1 | 1/2012 | Hsin et al. |
| 2012/0034464 A1 | 2/2012 | Chakraborty et al. |
| 2012/0037431 A1 | 2/2012 | DiGiovanni et al. |
| 2013/0068540 A1 | 3/2013 | DiGiovanni |
| 2013/0068541 A1 | 3/2013 | DiGiovanni et al. |
| 2013/0149447 A1 | 6/2013 | Mazyar et al. |
| 2015/0143755 A1 | 5/2015 | Chakraborty |
| 2016/0052109 A1 | 2/2016 | DiGiovanni |

FOREIGN PATENT DOCUMENTS

| | | |
|---|---|---|
| CN | 1763267 A | 4/2006 |
| CN | 1954042 A | 4/2007 |
| DE | 102011050112 A1 | 11/2011 |
| EP | 604211 A1 | 6/1994 |
| EP | 659510 B1 | 6/1995 |
| EP | 343846 | 4/1996 |
| EP | 941791 A2 | 9/1999 |
| EP | 1321545 A1 | 6/2003 |
| EP | 1330323 B1 | 5/2006 |
| EP | 2105256 A1 | 9/2009 |
| EP | 2147903 A2 | 1/2010 |
| EP | 2431327 A1 | 3/2012 |
| JP | 01103990 | 4/1989 |
| JP | 04317497 | 11/1992 |
| JP | 05132394 | 5/1993 |
| JP | 09201525 | 8/1997 |
| JP | 2007002278 | 1/2007 |
| JP | 2008115303 A | 5/2008 |
| JP | 2009-091234 | 4/2009 |
| WO | 0038864 A1 | 7/2000 |
| WO | 02034437 A2 | 5/2002 |
| WO | 02034437 A3 | 5/2002 |
| WO | 2006032984 A2 | 3/2006 |
| WO | 2006061672 A1 | 6/2006 |
| WO | WO2007041381 | 4/2007 |
| WO | 2008014003 A2 | 1/2008 |
| WO | 2008092093 A2 | 7/2008 |
| WO | 2008094190 A2 | 8/2008 |
| WO | WO2008130431 A2 | 10/2008 |
| WO | WO2009048268 A2 | 4/2009 |
| WO | 2009118381 A2 | 10/2009 |
| WO | WO2009147629 A1 | 12/2009 |
| WO | WO2010045257 A1 | 4/2010 |
| WO | 2010062419 A2 | 6/2010 |
| WO | WO2010124625 A1 | 11/2010 |
| WO | 2011046838 A1 | 4/2011 |
| WO | WO2011130023 A2 | 10/2011 |
| WO | WO2011130517 A2 | 10/2011 |

OTHER PUBLICATIONS

"Clathrate hydrates" Peter Englezos Industrial & Engineering Chemistry Research 1993 32 (7), 1251-1274. DOI: 10.1021/ie00019a001.*

Atwater et al., Accelerated growth of carbon nanofibers using physical mixtures and alloys of Pd and Co in an ethylene-hydrogen environment, Carbon 49 (2011) pp. 1058-1066.
Cappelli et al, "In-situ mass sampling during supersonic arcject synthesis of diamond," Diamond and Related Materials, 3 (1994), pp. 417-421.
Cleveland et al., Raman Spectrum of 1-Bromo-Dodecane, Journal of Chemical Physics, (1940), vol. 8, pp. 367-868.
European Search Report for European Application No. 12831673.4 dated Jun. 18, 2015, 7 pages.
Han et al., Conversion of Nickel Coated Carbon Nanotubes to Diamond under High Pressure and High Temperature; Jpn. J.Appl. Phys. /vol. 37: pp. L105-L1086; 1987.
Homma et al., Single-Walled Carbon Nanotube Growth with Non-Iron-Group "Catalysts" by Chemical Vapor Deposition, Nano Res (2009) 2: pp. 793-799.
Koizumi et al., Physics and Applications of CVD Diamond, Wiley-VCH Verlag GmbH & Co. KGaA, 2008, ISB: 78-3-527-40801-6, 55 pages.
Mahdavian et al., Nanocomposite Particles with Core-Shell Morphology III: Preparation and Characterization of Nano Al2O3-Poly(styrene-methyl Methacrylate) Particles via Miniemulsion Polymerization, Polym. Bull. (2009) vol. 63, pp. 329-340.
Martin, High-quality diamonds from an acetylene mechanism, Journal of Materials Science Letters 12 (1993), pp. 246-248.
Matsumoto et al, Vapor Deposition of Diamond Particles from Methane, Japanese Journal of Applied Physics, vol. 21, No. 4, Apr. 1982, pp. L183-L185.
Mazyar et al., U.S. Appl. No. 13/316,094, entitled, Method of Forming Carbonaceous Particles and Articles Therefrom, filed Dec. 9, 2011—Now 20130149447.
Panchakarla et al., "Carbon nanostructures and graphite-coated metal nanostructures obtained by pyrolysis of ruthenocene and ruthenocene-ferrocene mixtures," Bull. Mater. Sci., vol. 30, No. 1, Feb. 2007, pp. 23-29.
Pohanish, Richard P., (2012). Sittig's Handbook of Toxic and Hazardous Chemicals and Carcinogens (6th Edition)—Paraffin Wax. Elsevier. Online version available at: http://app.knovel.com/hotlink/pdf/id:kt0094M12G/sittigs-handbook-toxic-3/paraffin-wax).
Rao et al., "Synthesis of multi-walled and single-walled nanotubes, aligned-nanotube bundles and nanorods by employing organometallic precursors," Mater Res Innovat (1998) 2, pp. 128-141.
Saint et al., Core-Shell Diamond as a Support for Solid-Phase Extraction and High-Performance Liquid chromatography, Anal. Chem., (2010), vol. 82, No. 11, pp. 4448-4456.
Zen et al., Carbon nanotubes by the metallocene route, Chemical Physics Letters 267 (1997) pp. 276-280.
Yang et al., Morphology and microstructure of spring-like carbon micro-coils/nano-coils prepared by catalytic pyrolysis of acetylene using Fe-containing alloy catalysts, Carbon 43 (2005) pp. 827-834.
Yarbrough et al., "Diamond growth with locally supplied methane and acetylene," J. Mater. Res., vol. 7, No. 2, Feb 1992, pp. 379-383.
Yu et al., Catalytic synthesis of carbon nanofibers and nanotubes by the pyrolysis of acetylene with iron nanoparticles prepared using a hydrogen-arc plasma method, Materials Letters 63 (2009) pp. 1677-1679.
Butler et al.; Controlled Synthesis of High Quality Micro/Nanodiamonds by Microwave Plasma Chemical Vapor Deposition; Diamond & Related Materials; 18, pp. 51-55; published online Sep. 30, 2008.
Liu et al., "Functionalization of Carbon Nano-Onions by Direct Fluorinations" Chem. Mater. vol. 19, No. 4 (2007) pp. 778-786.
Moore et al., Individually Suspended Single-Walled Carbon Nanotubes in Various Surfactants, American Chemical Society, Nano Letters, vol. 3, No. 10, 2003, pp. 1379-1382.
Kruger; Diamond Nanoparticles: Jewels for Chemistry and Physics; Ad. Mater.; 20, 2445-2449; 2008.
Delmas M et al: "Long and aligned multi-walled carbon nanotubes grown on carbon and metallic substrates by injection-CVD process", ECS Transactions, Electrochemical Society, US, vol. 25, No.

(56) References Cited

OTHER PUBLICATIONS

8, Jan. 1, 2009 (Jan. 1, 2009), pp. 757-762, XP008131461, ISSN: 1938-5862, DOI: 1 0.1149/1 .3207664.

* cited by examiner

CUTTING ELEMENTS AND EARTH-BORING TOOLS INCLUDING A POLYCRYSTALLINE DIAMOND MATERIAL

CROSS-REFERENCE TO RELATED APPLICATIONS

This application is a divisional of U.S. patent application Ser. No. 14/929,611, filed Nov. 2, 2015, now U.S. Pat. No. 9,481,073, issued Nov. 1, 2016, which is a continuation of U.S. patent application Ser. No. 13/619,210, filed Sep. 14, 2012, now U.S. Pat. No. 9,205,531, issued Dec. 8, 2015, which claims the benefit of U.S. Provisional Patent Application Ser. No. 61/535,470, filed Sep. 16, 2011, in the name of Anthony A. DiGiovanni, the disclosure of each of which is hereby incorporated herein in its entirety by this reference.

The subject matter of this application is also related to the subject matter of U.S. patent application Ser. No. 13/619,210, filed Sep. 14, 2012, now U.S. Pat. No. 9,205,531, issued Dec. 8, 2015, the disclosure of which is hereby incorporated herein in its entirety by this reference. The subject matter of this application is also related to the subject matter of U.S. patent application Ser. No. 13/316,094, filed Dec. 9, 2011, pending, the disclosure of which is hereby incorporated herein in its entirety by this reference.

TECHNICAL FIELD

Embodiments of the present invention relate generally to methods of forming polycrystalline diamond material, cutting elements including polycrystalline diamond material, and earth-boring tools for drilling subterranean formations including such cutting elements.

BACKGROUND

Earth-boring tools for forming wellbores in subterranean earth formations may include a plurality of cutting elements secured to a body. For example, fixed-cutter earth-boring rotary drill bits (also referred to as "drag bits") include a plurality of cutting elements that are fixedly attached to a bit body of the drill bit. Similarly, roller cone earth-boring rotary drill bits include cones that are mounted on bearing pins extending from legs of a bit body such that each cone is capable of rotating about the bearing pin on which the cone is mounted. A plurality of cutting elements may be mounted to each cone of the drill bit.

The cutting elements used in such earth-boring tools often include polycrystalline diamond cutters (often referred to as "PDCs"), which are cutting elements that include a polycrystalline diamond (PCD) material. Such polycrystalline diamond cutting elements are formed by sintering and bonding together relatively small diamond grains or crystals under conditions of high temperature and high pressure in the presence of a catalyst (such as cobalt, iron, nickel, or alloys and mixtures thereof) to form a layer of polycrystalline diamond material on a cutting element substrate. These processes are often referred to as high pressure/high temperature (or "HPHT") processes. The cutting element substrate may comprise a cermet material (i.e., a ceramic-metal composite material) such as cobalt-cemented tungsten carbide. In such instances, the cobalt (or other catalyst material) in the cutting element substrate may be drawn into the diamond grains or crystals during sintering and serve as a catalyst material for forming a diamond table from the diamond grains or crystals. In other methods, powdered catalyst material may be mixed with the diamond grains or crystals prior to sintering the grains or crystals together in an HPHT process.

Upon formation of a diamond table using an HPHT process, catalyst material may remain in interstitial spaces between the grains or crystals of diamond in the resulting polycrystalline diamond table. The presence of the catalyst material in the diamond table may contribute to thermal damage in the diamond table when the cutting element is heated during use, due to friction at the contact point between the cutting element and the formation. Polycrystalline diamond cutting elements in which the catalyst material remains in the diamond table are generally thermally stable up to a temperature of about 750° C., although internal stress within the polycrystalline diamond table may begin to develop at temperatures exceeding about 350° C. This internal stress is at least partially due to differences in the rates of thermal expansion between the diamond table and the cutting element substrate to which it is bonded. This differential in thermal expansion rates may result in relatively large compressive and tensile stresses at the interface between the diamond table and the substrate, and may cause the diamond table to delaminate from the substrate. At temperatures of about 750° C. and above, stresses within the diamond table may increase significantly due to differences in the coefficients of thermal expansion of the diamond material and the catalyst material within the diamond table itself. For example, cobalt thermally expands significantly faster than diamond, which may cause cracks to form and propagate within a diamond table including cobalt, eventually leading to deterioration of the diamond table and ineffectiveness of the cutting element.

To reduce the problems associated with different rates of thermal expansion in polycrystalline diamond cutting elements, so-called "thermally stable" polycrystalline diamond (TSD) cutting elements have been developed. Such a thermally stable polycrystalline diamond cutting element may be formed by leaching the catalyst material (e.g., cobalt) out from interstitial spaces between the diamond grains in the diamond table using, for example, an acid. All of the catalyst material may be removed from the diamond table, or only a portion may be removed. Thermally stable polycrystalline diamond cutting elements in which substantially all catalyst material has been leached from the diamond table have been reported to be thermally stable up to temperatures of about 1200° C. It has also been reported, however, that such fully leached diamond tables are relatively more brittle and vulnerable to shear, compressive, and tensile stresses than are non-leached diamond tables. In an effort to provide cutting elements having diamond tables that are more thermally stable relative to non-leached diamond tables, but that are also relatively less brittle and vulnerable to shear, compressive, and tensile stresses relative to fully leached diamond tables, cutting elements have been provided that include a diamond table in which only a portion of the catalyst material has been leached from the diamond table.

BRIEF SUMMARY

In some embodiments of the disclosure, a method of fabricating polycrystalline diamond includes encapsulating diamond particles and a hydrocarbon substance in a canister and subjecting the encapsulated diamond particles and hydrocarbon substance to a pressure of at least 5.0 GPa and a temperature of at least 1400° C. to form inter-granular bonds between the diamond particles.

In some embodiments, a cutting element for use in an earth-boring tool includes a polycrystalline diamond material formed by encapsulating diamond particles and a hydrocarbon substance in a canister and subjecting the encapsulated diamond particles and hydrocarbon substance to a pressure of at least 5.0 GPa and a temperature of at least 1400° C. to form inter-granular bonds between the diamond particles.

In some embodiments, an earth-boring tool includes a cutting element. The cutting element includes a polycrystalline diamond material formed by encapsulating diamond particles and a hydrocarbon substance in a canister and subjecting the encapsulated diamond particles and hydrocarbon substance to a pressure of at least 5.0 GPa and a temperature of at least 1400° C. to form inter-granular bonds between the diamond particles.

DETAILED DESCRIPTION

The illustrations presented herein are not meant to be actual views of any particular material, apparatus, system, or method, but are merely idealized representations which are employed to describe certain embodiments of the present invention. For clarity in description, various features and elements common among the embodiments of the invention may be referenced with the same or similar reference numerals.

Figure 1:
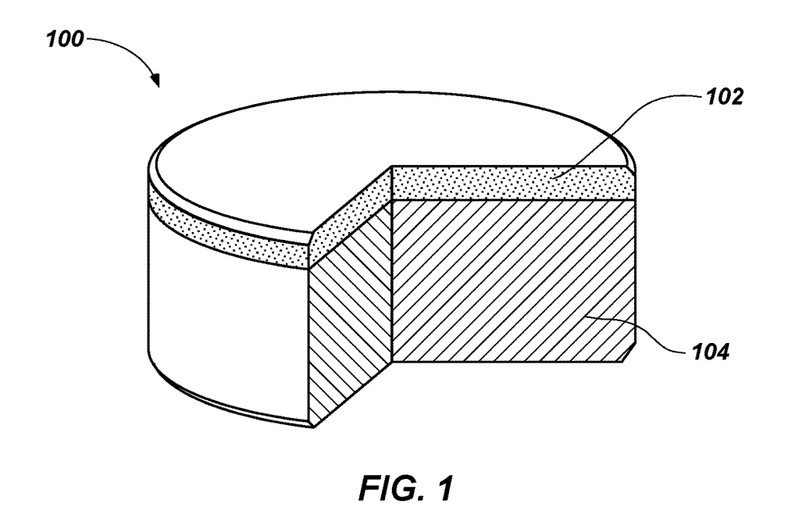
FIG. 1 is a partially cut-away perspective view of an embodiment of a cutting element including a volume of polycrystalline diamond on a substrate.

FIG. 1 illustrates a cutting element 100, which may be formed in accordance with embodiments of methods as disclosed herein. The cutting element 100 includes polycrystalline diamond 102. Optionally, the cutting element 100 also may include a substrate 104, to which the polycrystalline diamond 102 may be bonded. For example, the substrate 104 may include a generally cylindrical body of cobalt-cemented tungsten carbide material, although substrates of different geometries and compositions also may be employed. The polycrystalline diamond 102 may be in the form of a table (i.e., a layer) of polycrystalline diamond 102 on the substrate 104, as shown in FIG. 1. The polycrystalline diamond 102 may be provided on (e.g., formed on or secured to) a surface of the substrate 104. In additional embodiments, the cutting element 100 may simply comprise a volume of the polycrystalline diamond 102 having any desirable shape, and may not include any substrate 104.

Figure 2:
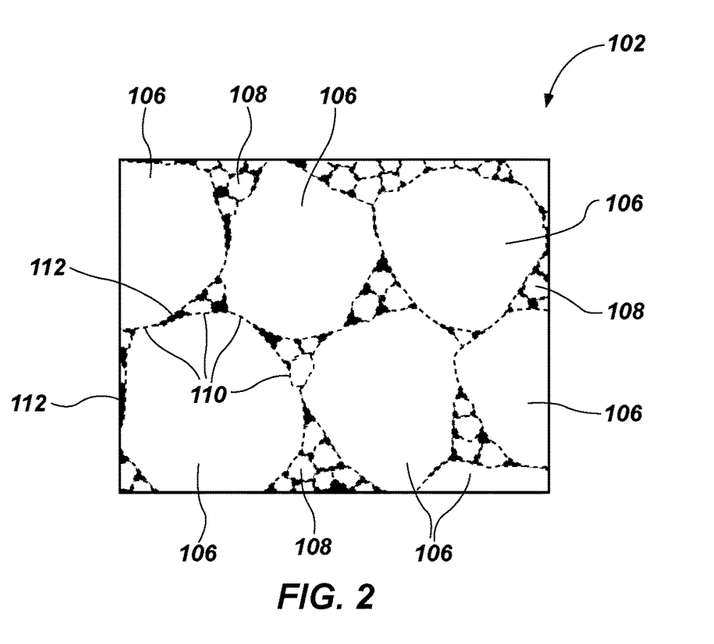
FIG. 2 is a simplified view illustrating how a microstructure of the polycrystalline diamond of the cutting element of FIG. 1 may appear under magnification.

As shown in FIG. 2, the polycrystalline diamond 102 may include interspersed and interbonded diamond grains that form a three-dimensional network of diamond material. Optionally, in some embodiments, the diamond grains of the polycrystalline diamond 102 may have a multimodal grain size distribution. For example, the polycrystalline diamond 102 may include larger diamond grains 106 and smaller diamond grains 108. The larger diamond grains 106 and/or the smaller diamond grains 108 may have average particle dimensions (e.g., mean diameters) of less than 1 mm, less than 0.1 mm, less than 0.01 mm, less than 1 μm, less than 0.1 μm, or even less than 0.01 μm. That is, the larger diamond grains 106 and smaller diamond grains 108 may each include micron diamond particles (diamond grains in a range from about 1 μm to about 500 μm (0.5 mm)), submicron diamond particles (diamond grains in a range from about 500 nm (0.5 μm) to about 1 μm), and/or diamond nanoparticles (particles having an average particle diameter of about 500 nm or less). In some embodiments, the larger diamond grains 106 may be micron diamond particles, and the smaller diamond grains 108 may be submicron diamond particles or diamond nanoparticles. In some embodiments, the larger diamond grains 106 may be submicron diamond particles, and the smaller diamond grains 108 may be diamond nanoparticles. In other embodiments, the diamond grains of the polycrystalline diamond 102 may have a monomodal grain size distribution. The direct diamond-to-diamond inter-granular bonds between the diamond grains 106, 108 are represented in FIG. 2 by dashed lines 110. Interstitial spaces 112 (shaded black in FIG. 2) are present between the interbonded diamond grains 106, 108 of the polycrystalline diamond 102. These interstitial spaces 112 may be at least partially filled with a solid substance, such as a metal solvent catalyst (e.g., iron, cobalt, nickel, or an alloy or mixture thereof). In other embodiments, the interstitial spaces 112 may include empty voids within the polycrystalline diamond 102 in which there is no solid or liquid substance (although a gas, such as air, may be present in the voids). Such empty voids may be formed by removing (e.g., leaching) solid material out from the interstitial spaces 112 after forming the polycrystalline diamond 102. In yet further embodiments, the interstitial spaces 112 may be at least partially filled with a solid substance in one or more regions of the polycrystalline diamond 102, while the interstitial spaces 112 in one or more other regions of the polycrystalline diamond 102 include empty voids.

Embodiments of methods disclosed herein may be used to form the polycrystalline diamond 102, and may result in improved inter-granular diamond-to-diamond bonding between the diamond grains 106, 108 in the polycrystalline diamond 102. In some embodiments, the polycrystalline diamond 102 may be formed by encapsulating diamond grains 106, 108 and a hydrocarbon substance in a canister and subjecting the encapsulated diamond grains 106, 108 and hydrocarbon substance to HPHT conditions (e.g., a pressure of at least 5.0 GPa and a temperature of at least 1400° C.) to form the direct diamond-to-diamond inter-granular bonds between the diamond grains 106, 108 and form the polycrystalline diamond 102. Such a process is described below with reference to FIG. 3.

Figure 3:
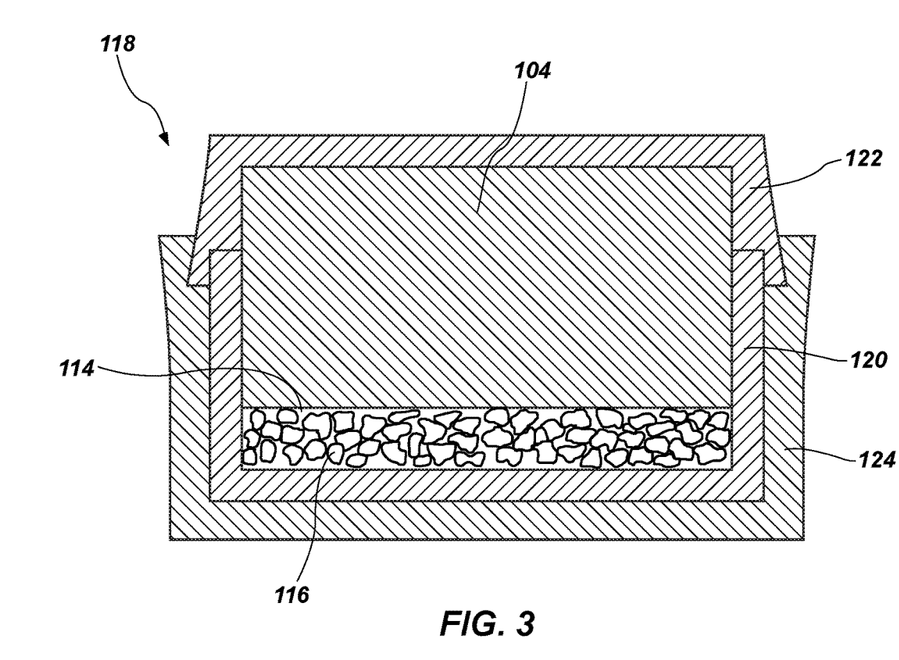
FIG. 3 is a simplified cross-sectional view illustrating materials used to form the cutting element of FIG. 1 in a container in preparation for subjecting the container to an HPHT sintering process.

Referring to FIG. 3, diamond particles 116 may be positioned within a canister 118 (e.g., a metal canister). The diamond particles 116 may include grains or crystals of diamond (e.g., diamond grit), which will ultimately form the diamond grains 106, 108 in the sintered polycrystalline diamond 102 (FIG. 2). A hydrocarbon substance 114 also may be present in the spaces between the diamond particles 116 in the canister 118. The hydrocarbon substance may be solid, liquid, or gaseous, and may include any substance having hydrogen and carbon atoms, such as an alkane, an alkene, an alkyne, a branched-chain compound, a cyclic compound, an aromatic compound, or any combination thereof. For example, in some embodiments, the hydrocarbon substance may include methane. The particular hydrocarbon substance or combination of hydrocarbon substances may be selected to have a selected ratio of carbon atoms to hydrogen atoms. For example, the hydrocarbon substance may have a ratio of carbon atoms to hydrogen atoms from about 1:1 to about 1:4, such as from about 1:3 to about 1:4.

As shown in FIG. 3, the canister 118 may include an inner cup 120 in which the diamond particles 116 and the hydrocarbon substance 114 may be provided. If the cutting element 100 is to include a substrate 104, the substrate 104 optionally may also be provided in the inner cup 120 over or under the diamond particles 116 and the hydrocarbon substance 114, and may ultimately be encapsulated in the canister 118. The canister 118 may further include a top end piece 122 and a bottom end piece 124, which may be assembled and bonded together (e.g., swage bonded) around the inner cup 120 with the diamond particles 116, the hydrocarbon substance 114, and the optional substrate 104 therein.

In the canister 118, the diamond particles 116 may have a packing fraction from about 45% to about 99% (i.e., with a void space of between about 55% and about 1% of the total volume), such as from about 50% to about 70% (i.e., with a void space of between about 50% and about 30% of the total volume). The hydrocarbon substance 114 may occupy void space between the diamond particles 116, such that the hydrocarbon substance 114 is in proximity to the diamond particles 116. For example, the hydrocarbon substance 114 may substantially fill the void space between the diamond particles 116. The mass of the hydrocarbon substance 114 may depend on the temperature and/or pressure of the materials in the canister 118. For example, if the hydrocarbon substance 114 is gaseous, the mass of the hydrocarbon substance 114 occupying the void space between the diamond particles 116 may increase in direct proportion to pressure and inversely in proportion to absolute temperature.

Methane is one of the primary carbon sources used to form films of polycrystalline diamond in known chemical vapor deposition (CVD) processes. As described herein, methane or another hydrocarbon substance 114 may be infiltrated as a gas into a canister 118 (e.g., into the inner cup 120 of the canister 118) in which diamond particles 116 are present. The canister 118 may then be sealed with the diamond particles 116 and the hydrocarbon substance 114 therein. The sealed canister 118 then may be subjected to an HPHT process to form the polycrystalline diamond 102 (FIGS. 1 and 2). The hydrocarbon substance 114 may be introduced after performing a vacuum purification process (e.g., after exposing the diamond particles 116 and/or the canister 118 to a reduced-pressure (vacuum) environment at a selected temperature to evaporate volatile compounds). The hydrocarbon substance 114 may also be introduced into the canister 118 under pressure, such that the concentration of the hydrocarbon substance 114 (which may be gaseous) is selectively controlled prior to sealing the canister 118 and subjecting the sealed canister 118 to HPHT conditions. In other words, by selectively controlling the pressure (e.g., partial pressure) of the gaseous hydrocarbon substance 114, the concentration of the hydrocarbon substance 114 in the sealed canister 118 also may be selectively controlled. In some embodiments in which the hydrocarbon substance 114 is introduced into the canister 118 under pressure, the partial pressure of the hydrocarbon substance 114 may be at least about 10 kPa, at least about 100 kPa, at least about 1000 kPa (1.0 MPa), at least about 10 MPa, at least about 100 MPa, or even at least about 500 MPa.

Similarly, the temperature of the hydrocarbon substance 114 and the canister 118 may be selectively controlled prior to sealing the canister 118 and subjecting the sealed canister 118 to HPHT conditions. For example, the hydrocarbon substance 114 may be introduced and the canister 118 sealed at temperatures, for example, of less than −150° C., less than −161° C., or less than −182° C. In some embodiments, the hydrocarbon substance 114 may be introduced at temperatures of about −196° C. (77 K) or even about −269° C. (4.2 K), temperatures of liquid nitrogen and liquid helium, respectively. At such temperatures, the hydrocarbon substance 114 may be liquid or solid, and sealing the canister 118 with the hydrocarbon substance 114 may be relatively simpler than sealing a gaseous hydrocarbon substance 114 in the canister 118. In particular, if the hydrocarbon substance 114 is methane, the methane may be in liquid form at temperatures less than −161° C. and in solid form at temperatures less than −182° C., the boiling point and melting point, respectively, of methane. Appropriate temperatures at which other hydrocarbon substances 114 are in liquid or solid form may be selected by a person having ordinary skill in the art, and are not tabulated herein.

Figure 4A:
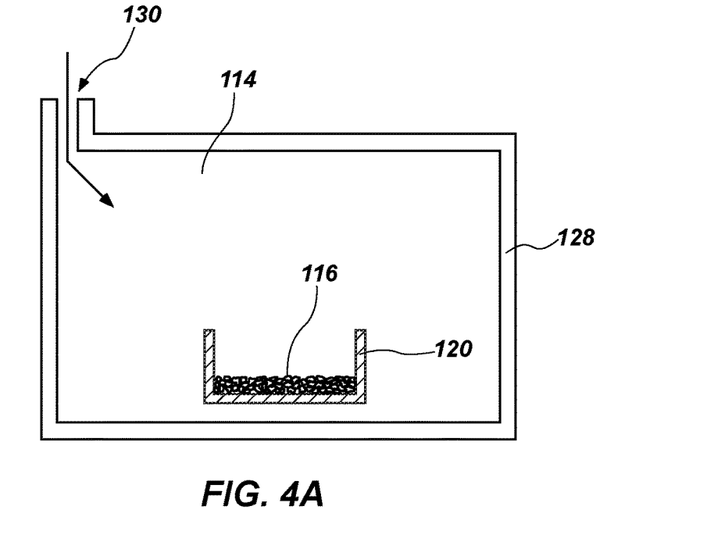
FIGS. 4A and 4B illustrate the materials of FIG. 3 being encapsulated in the container of FIG. 3 in a gaseous environment comprising a hydrocarbon substance (e.g., methane) within an enclosed chamber.

FIG. 4A illustrates diamond particles 116 disposed within an inner cup 120 of the canister 118 (FIG. 3) in an enclosed chamber 128. As discussed above with respect to FIG. 2, the diamond particles 116 may have a monomodal or multimodal grain size distribution. For example, the diamond particles 116 may include micron diamond particles, submicron diamond particles, and/or diamond nanoparticles. Before the HPHT process, the diamond particles 116 that ultimately will form the diamond grains 106, 108 of the polycrystalline diamond 102 may be subjected to thermal treatments under vacuum to reduce impurities. After this purification process, hydrocarbon substances 114 can be introduced into the purified diamond particles 116.

The hydrocarbon substance 114 may be introduced as a gas into the enclosed chamber 128 through an inlet 130, as illustrated by the directional arrow in FIG. 4A. The pressure of the hydrocarbon substance 114 within the enclosed chamber 128 may be selectively controlled (e.g., increased) to selectively control the amount of the hydrocarbon substance 114 to be encapsulated within the canister 118 (FIG. 3). For example, the pressure of the hydrocarbon substance 114 within the enclosed chamber 128 may be at least about 10 kPa, at least about 100 kPa, at least about 1000 kPa (1.0 MPa), at least about 10 MPa, at least about 100 MPa, or even at least about 500 MPa.

Figure 4B:
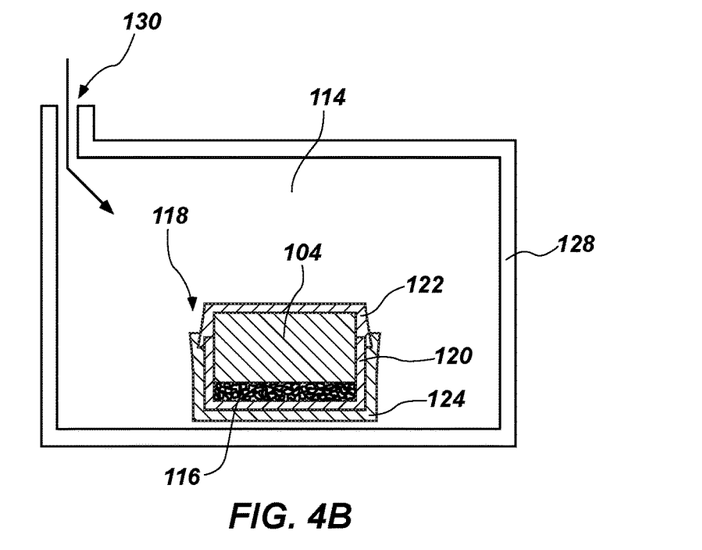

Referring to FIG. 4B, the canister 118 may be assembled within the enclosed chamber 128 to encapsulate the diamond particles 116 and the hydrocarbon substance 114 present in the gaseous environment in the enclosed chamber 128 within the canister 118. The sealed canister 118 then may be subjected to HPHT processing.

In some embodiments, the hydrocarbon substance 114 can be introduced into the canister 118 after placing the diamond particles 116 in the canister 118.

In other embodiments, the hydrocarbon substance 114 may be introduced to the diamond particles 116 in a separate container prior to inserting the diamond particles 116 into the canister 118. In such embodiments, the diamond particles 116 may remain in a hydrocarbon-containing environment until they are sealed in the canister 118 to be subjected to HPHT processing.

In additional embodiments of the disclosure, the hydrocarbon substance 114 may be mixed with the diamond particles 116 and sealed in the canister 118 to be subjected to HPHT processing while the hydrocarbon substance 114 is in a solid or liquid state. For example, the hydrocarbon substance 114 may be a compressed liquid or solid or a complex of a hydrocarbon with another material. In some embodiments, the hydrocarbon substance 114 may include a hydrated hydrocarbon, such as methane hydrate (i.e., methane clathrate), ethane hydrate, etc. Methane hydrate, other hydrocarbon hydrates, or other forms of hydrocarbon mixtures that may be in a liquid or solid form may be introduced with the diamond particles 116. Introducing the hydrocarbon substance 114 may optionally be performed at temperatures below room temperature (e.g., at cryogenic temperatures). For example, the hydrocarbon substance 114 may be introduced with the diamond particles 116 at temperatures at which the hydrocarbon substance 114 forms a liquid or a solid, for example, temperatures of less than −150° C., less than −161° C., or less than −182° C.

Figure 5:
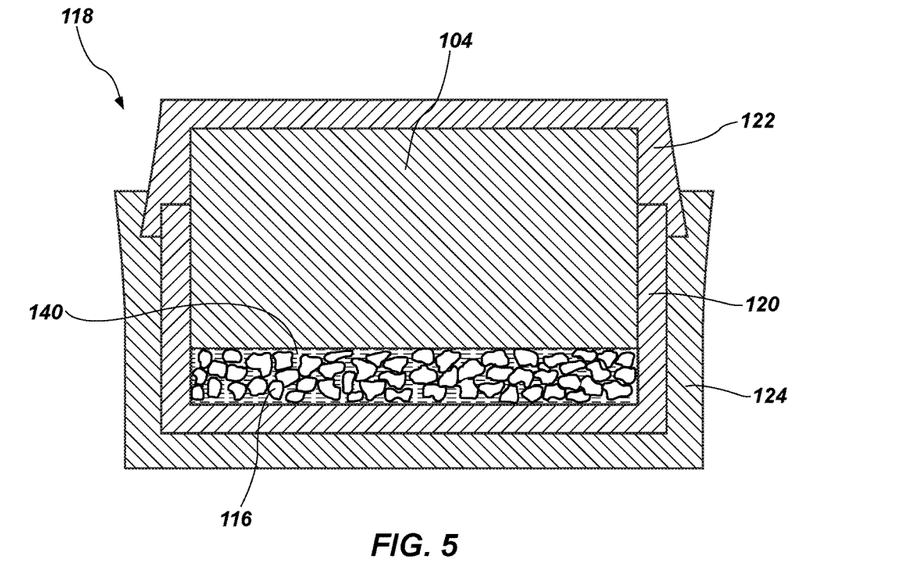
FIG. 5 is a simplified cross-sectional view illustrating a mixture of diamond particles and a liquid hydrocarbon substance encapsulated within a container in preparation for subjecting the container and the mixture therein to an HPHT sintering process to form a polycrystalline diamond compact cutting element.
Figure 6:
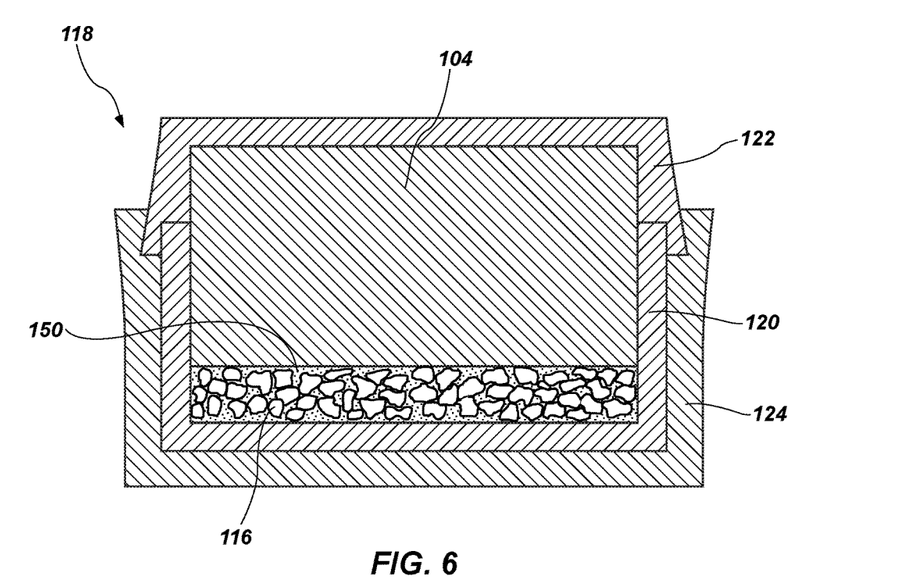
FIG. 6 is a simplified cross-sectional view illustrating a mixture of diamond particles and a liquid hydrocarbon substance encapsulated within a container in preparation for subjecting the container and the mixture therein to an HPHT sintering process to form a polycrystalline diamond compact cutting element.

For example, FIG. 5 illustrates diamond particles 116, a liquid 140 in the spaces between the diamond particles 116, and an optional substrate 104 encapsulated within a canister 118, which may be subjected to HPHT processing. The liquid 140 may include liquid methane or another liquid hydrocarbon (e.g., ethane, propane, butane, pentane, hexane, heptane, octane, etc.). FIG. 6 illustrates diamond particles 116, a solid 150 in the spaces between the diamond particles 116, and an optional substrate 104 encapsulated within a canister 118, which may be subjected to HPHT processing. The solid 150 may comprise solid particles of methane or another hydrocarbon substance (e.g., ethane, propane, butane, pentane, hexane, heptane, octane, etc.).

Without being bound by any particular theory, it is believed that the hydrocarbon substance 114 (FIG. 3) promotes the formation of diamond-to-diamond inter-granular bonds 110 between the diamond grains 106, 108, as shown in FIG. 2. For example, the hydrocarbon substance 114 may dissociate in HPHT conditions. Each carbon atom of the hydrocarbon substance 114, after dissociation, may bond with one or more of the diamond particles 116 (FIG. 3). The hydrogen atoms, after dissociation, may form hydrogen gas ($H_2$), which may be a reducing agent. Some hydrogen gas may react with impurities or catalyst material (if present) within the polycrystalline diamond 102. Some hydrogen gas may diffuse out of the polycrystalline diamond 102 and may react with material of the canister 118. Some hydrogen gas may bond to exposed surfaces of the polycrystalline diamond 102 to form hydrogen-terminated polycrystalline diamond.

Figure 7:
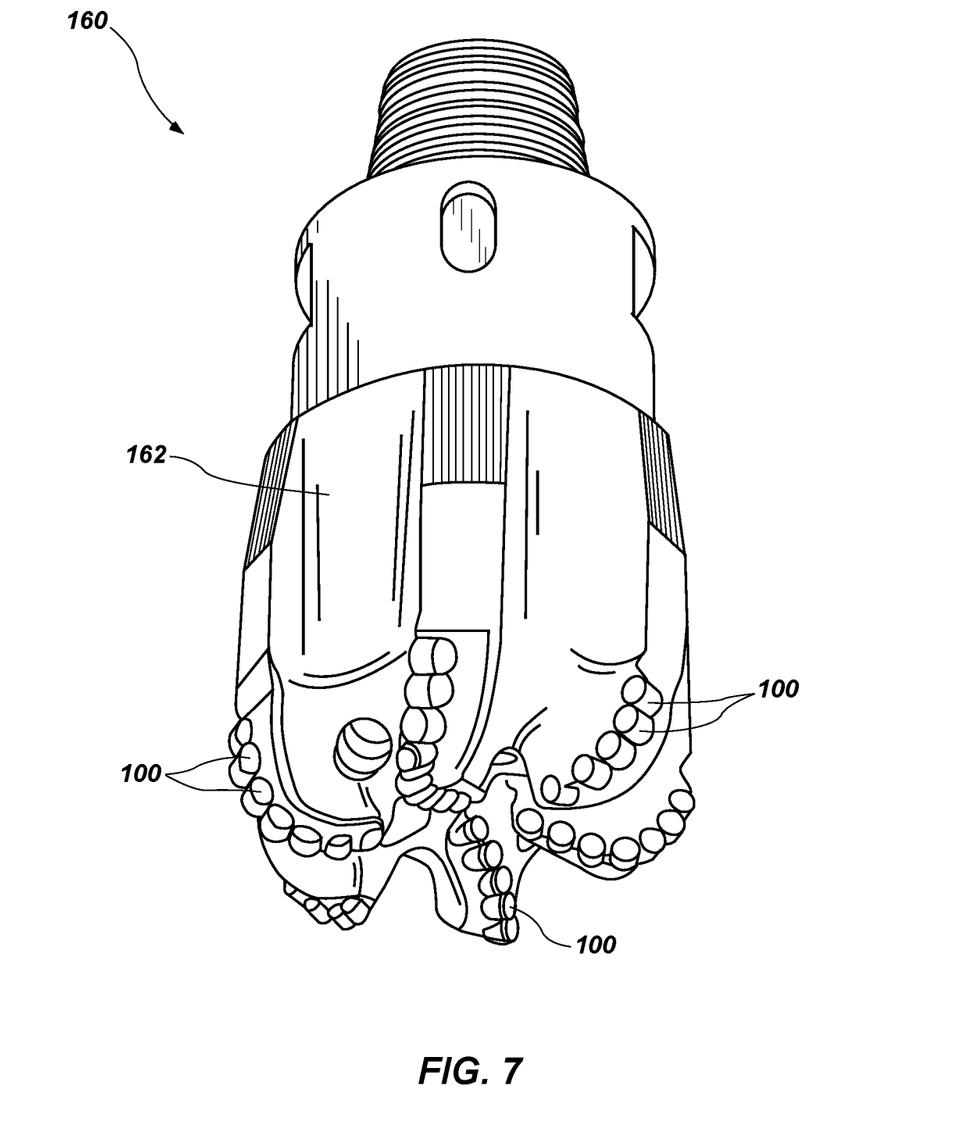
FIG. 7 illustrates an earth-boring rotary drill bit comprising polycrystalline diamond cutting elements as described herein.

Embodiments of cutting elements 100 (FIG. 1) that include polycrystalline diamond 102 fabricated as described herein may be mounted to earth-boring tools and used to remove subterranean formation material in accordance with additional embodiments of the present disclosure. FIG. 7 illustrates a fixed-cutter earth-boring rotary drill bit 160. The drill bit 160 includes a bit body 162. A plurality of cutting elements 100 as described herein may be mounted on the bit body 162 of the drill bit 160. The cutting elements 100 may be brazed or otherwise secured within pockets formed in the outer surface of the bit body 162. Other types of earth-boring tools, such as roller cone bits, percussion bits, hybrid bits, reamers, etc., also may include cutting elements 100 as described herein.

Additional non-limiting example embodiments of the disclosure are described below.

Embodiment 1

A method of fabricating polycrystalline diamond, comprising encapsulating diamond particles and a hydrocarbon substance in a canister and subjecting the encapsulated diamond particles and hydrocarbon substance to a pressure of at least 5.0 GPa and a temperature of at least 1400° C. to form inter-granular bonds between the diamond particles.

Embodiment 2

The method of Embodiment 1, wherein encapsulating the diamond particles and the hydrocarbon substance in the canister comprises placing the diamond particles in the canister, positioning the canister with the diamond particles therein in an environment comprising a gaseous hydrocarbon substance, and sealing the canister in the environment comprising the gaseous hydrocarbon substance.

Embodiment 3

The method of Embodiment 2, further comprising, positioning the canister with the diamond particles therein in a chamber, and introducing the gaseous hydrocarbon substance into the chamber.

Embodiment 4

The method of Embodiment 3, further comprising increasing a pressure within the chamber.

Embodiment 5

The method of Embodiment 4, further comprising selecting the pressure within the chamber to selectively control an amount of the hydrocarbon substance to be encapsulated within the canister.

Embodiment 6

The method of any of Embodiments 1 through 5, wherein encapsulating the diamond particles and the hydrocarbon substance in the canister comprises placing the diamond particles in the canister, placing a liquid or solid hydrocarbon substance in the canister with the diamond particles, and sealing the canister with the diamond particles and the liquid or solid hydrocarbon substance therein.

Embodiment 7

The method of Embodiment 6, wherein sealing the canister with the diamond particles and the liquid or solid hydrocarbon substance therein comprises sealing the canister at a temperature of about −150° C. or less.

Embodiment 8

The method of Embodiment 7, wherein sealing the canister at a temperature of about −150° C. or less comprises sealing the canister at a temperature of about −161° C. or less.

Embodiment 9

The method of Embodiment 8, wherein sealing the canister at a temperature of about −161° C. or less comprises sealing the canister at a temperature of about −182° C. or less.

Embodiment 10

The method of any of Embodiments 6 through 9, wherein placing the liquid or solid hydrocarbon substance in the canister with the diamond particles comprises placing a hydrated hydrocarbon in the canister with the diamond particles.

Embodiment 11

The method of any of Embodiments 1 through 10, wherein encapsulating the diamond particles and the hydrocarbon substance in the canister comprises encapsulating the diamond particles and the hydrocarbon substance in the canister at a temperature below room temperature.

Embodiment 12

The method of any of Embodiments 1 through 11, wherein encapsulating diamond particles and a hydrocarbon substance in the canister comprises encapsulating diamond nanoparticles and a hydrocarbon substance in the canister.

Embodiment 13

The method of any of Embodiments 1 through 12, further comprising selecting the hydrocarbon substance to comprise at least one of methane, ethane, propane, butane, pentane, hexane, heptane, octane, and hydrates thereof.

Embodiment 14

The method of Embodiment 13, further comprising selecting the hydrocarbon substance to comprise methane.

Embodiment 15

The method of Embodiment 13, further comprising selecting the hydrocarbon substance to comprise methane hydrate.

Embodiment 16

A cutting element for use in an earth-boring tool, the cutting element comprising a polycrystalline diamond material formed by a method comprising encapsulating diamond particles and a hydrocarbon substance in a canister and subjecting the encapsulated diamond particles and hydrocarbon substance to a pressure of at least 5.0 GPa and a temperature of at least 1400° C. to form inter-granular bonds between the diamond particles.

Embodiment 17

The cutting element of Embodiment 16, wherein encapsulating the diamond particles and the hydrocarbon substance in the canister comprises placing the diamond particles in the canister, positioning the canister with the diamond particles therein in a chamber, introducing a gaseous hydrocarbon substance into the chamber, and sealing the canister in the gaseous hydrocarbon substance environment.

Embodiment 18

An earth-boring tool comprising a cutting element, the cutting element comprising a polycrystalline diamond material formed by a method comprising encapsulating diamond particles and a hydrocarbon substance in a canister, and subjecting the encapsulated diamond particles and hydrocarbon substance to a pressure of at least 5.0 GPa and a temperature of at least 1400° C. to form inter-granular bonds between the diamond particles.

Embodiment 19

The earth-boring tool of Embodiment 18, wherein encapsulating the diamond particles and the hydrocarbon substance in the canister comprises placing the diamond particles in the canister, positioning the canister with the diamond particles therein in a chamber, introducing a gaseous hydrocarbon substance into the chamber, and sealing the canister in the gaseous hydrocarbon substance environment.

Embodiment 20

The earth-boring tool of Embodiment 18 or Embodiment 19, wherein the earth-boring tool comprises an earth-boring rotary drill bit.

While the present invention has been described herein with respect to certain embodiments, those of ordinary skill in the art will recognize and appreciate that it is not so limited. Rather, many additions, deletions, and modifications to the embodiments depicted and described herein may be made without departing from the scope of the invention as hereinafter claimed, and legal equivalents. In addition, features from one embodiment may be combined with features of another embodiment while still being encompassed within the scope of the invention as contemplated by the inventor. Further, the invention has utility in drill bits having different bit profiles as well as different cutter types.

What is claimed is:

1. A cutting element for use in an earth-boring tool, the cutting element comprising:
   a substrate; and
   a polycrystalline diamond material secured to the substrate, the polycrystalline diamond material comprising diamond particles having direct diamond-to-diamond inter-granular bonds between the diamond particles, the direct diamond-to-diamond inter-granular bonds between the diamond particles comprising in situ deposited carbon atoms between the diamond particles, the carbon atoms dissociated from a hydrocarbon substance used during exposure of the diamond particles and the hydrocarbon substance to high pressure, high temperature conditions during formation of the direct diamond-to-diamond inter-granular bonds, at least one surface of the polycrystalline diamond material comprising hydrogen-terminated polycrystalline diamond originated from the hydrocarbon substance.

2. The cutting element of claim 1, wherein the diamond particles comprise a first group of diamond grains having a mean diameter larger than a mean diameter of a second group of diamond grains.

3. The cutting element of claim 1, wherein the polycrystalline diamond material comprises interspersed and interbonded diamond grains that form a three-dimensional network of diamond material.

4. The cutting element of claim 1, wherein at least some of the direct diamond-to-diamond inter-granular bonds between the diamond particles comprise carbon atoms dissociated from a liquid hydrocarbon substance selected from the group consisting of methane, ethane, propane, butane, pentane, hexane, heptane, and octane.

5. The cutting element of claim 1, wherein the polycrystalline diamond material comprises reaction products of catalyst materials and hydrogen from a liquid hydrocarbon used to form the polycrystalline diamond material.

6. An earth-boring tool, comprising:
a bit body; and
inter-granular bonds between at least one cutting element secured to the bit body, the at least one cutting element comprising a polycrystalline diamond material comprising diamond particles formed by encapsulating the diamond particles with a hydrocarbon substance in a canister and subjecting the encapsulated diamond particles and the hydrocarbon substance to a pressure of at least 5.0 GPa and a temperature of at least 1,400° C. to form inter-granular bonds between the diamond particles, the inter-granular bonds comprising in situ deposited carbon atoms between the diamond particles, the carbon atoms dissociated from the hydrocarbon substance, at least one surface of the polycrystalline diamond material comprising hydrogen-terminated polycrystalline diamond, the hydrogen originating from the hydrocarbon substance.

7. The earth-boring tool of claim 6, wherein the earth-boring tool comprises an earth-boring rotary drill bit.

8. The earth-boring tool of claim 6, wherein the at least one cutting element further comprises a substrate, and wherein the polycrystalline diamond material is secured to the substrate.

9. The earth-boring tool of claim 6, wherein the at least one cutting element is brazed within a pocket of the bit body.

10. The earth-boring tool of claim 6, wherein the polycrystalline diamond material is secured to a substrate.

11. The earth-boring tool of claim 6, wherein the polycrystalline diamond comprises interspersed and interbonded diamond grains that form a three-dimensional network of diamond material.

12. The cutting element of claim 6, wherein the polycrystalline diamond material comprises reaction products of catalyst materials and hydrogen from a liquid hydrocarbon used to form the polycrystalline diamond material.

13. A cutting element for use in an earth-boring tool, the cutting element comprising a polycrystalline diamond material formed by a method comprising:
encapsulating diamond particles and a hydrocarbon substance having a ratio of carbon atoms to hydrogen atoms from about 1:3 to about 1:4 in a canister; and
after encapsulating the diamond particles and the hydrocarbon substance in the canister, subjecting the encapsulated diamond particles and the hydrocarbon substance to a pressure of at least 5.0 GPa and a temperature of at least 1,400° C. to form a polycrystalline diamond material including a plurality of direct diamond-to-diamond inter-granular bonds between the diamond particles, the inter-granular bonds comprising in situ deposited carbon atoms originating from the hydrocarbon substance during the subjecting the encapsulated diamond particles and the hydrocarbon substance to a pressure of at least 5.0 GPa and a temperature of at least 1,400° C., wherein at least one surface of the polycrystalline diamond material comprises hydrogen-terminated polycrystalline diamond.

14. The cutting element of claim 13, further comprising selecting the hydrocarbon substance to comprise a hydrated hydrocarbon.

15. The cutting element of claim 14, further comprising selecting the hydrated hydrocarbon to comprise methane hydrate and ethane hydrate.

16. The cutting element of claim 13, wherein the polycrystalline diamond comprises interspersed and interbonded diamond grains that form a three-dimensional network of diamond material.

* * * * *